Feb. 8, 1927. 1,617,220
K. E. PEILER
METHOD OF AND APPARATUS FOR SHAPING MOLTEN GLASS
Filed March 30, 1922

INVENTOR:
KARL E. PEILER
BY W. H. Thomas
ATT'Y.

Patented Feb. 8, 1927.

1,617,220

UNITED STATES PATENT OFFICE.

KARL E. PEILER, OF WEST HARTFORD, CONNECTICUT, ASSIGNOR TO HARTFORD-EMPIRE COMPANY, OF HARTFORD, CONNECTICUT, A CORPORATION OF DELAWARE.

METHOD OF AND APPARATUS FOR SHAPING MOLTEN GLASS.

Application filed March 30, 1922. Serial No. 547,990.

This invention relates to a method of and apparatus for shaping molten glass in which a suction mold is employed to draw a charge of glass from a supply into the mold.

In the manufacture of certain classes of glassware, it is very desirable that the more conspicuous or important parts shall be of uniform thickness and free from blemishes. For example, in the manufacture of electric lights bulbs, the generally hemispherical end opposite the base should be of uniform thickness and as nearly perfect as possible in external appearance and optical effect. In some bulb making machines, as illustrated in Patent No. 1,021,048 of March 26, 1912, the blank or parison is formed in a mold into which the glass is drawn by suction, acting through thin slots or ports in the wall of the mold. These suction ports are preferably located around the base portion of the parison, from which any inequalities of surface or chilling, due to the ports, are removed by marvering or other subsequent treatment of the parison. Moreover, these base portions of the parison are usually cut off and discarded in the subsequent operations. The suction ports preferably do not extend into the upper hemispherical end of the mold cavity, which is thus left imperforate and smooth to avoid marking, and also to insure uniform chilling of the skin or surface of the parison, in order that it will be blown out uniformly in thickness and appearance in the subsequent blowing operations. It is well understood that the glass would be blown out thinner at the softer spots caused by an unequal chilling of the glass.

This arrangement of the suction slots, although favorable in the respects mentioned, is liable to result in failure to fully fill the mold, and thereby bring the entire upper surface of the parison into equal chilling contact with the mold wall. This is due to the circumstance that the glass as it is drawn into the mold by the suction closes the suction ports completely before the mold is filled, and further sucking-in of the glass is dependent upon the progressively lessening residual vacuum in the remaining cavity, aided perhaps under some conditions by the momentum of the glass. These remaining forces are however too variable and uncertain to insure the desired complete and uniform filling of the mold, and the resultant uniform surface chilling of the parison.

The object of the present invention is to provide a method and apparatus which will overcome the difficulties referred to, and produce blanks or parisons capable of being formed into finished ware free from imperfections. The method includes the steps of drawing a charge of glass by suction into a mold having an imperforate pocket, and applying pressure to the charge to insure the complete filling of the pocket. Any suitable means may be provided for applying pressure to the charge such, for instance, as a plunger, but it is preferred to employ compressed air for this purpose.

This invention is herein illustrated and described as embodied in and applied to apparatus similar to that shown and described in the Patent, 1,021,048, referred to above.

Figure 1:
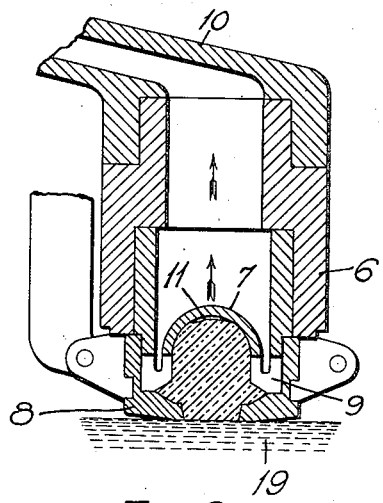
Figure 1 is a vertical section through a gathering head or parison mold during the suction charging operation.
Figure 2:
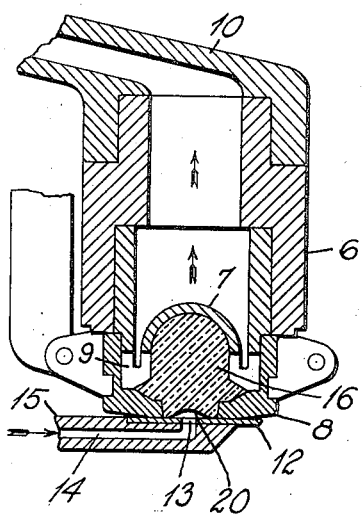
Fig. 2 is a similar view showing the application of pressure to cause the glass in the mold to conform to the wall of the mold cavity.

The apparatus selected for the purpose of illustration comprises a head 6 carrying a parison mold 7 and a neck ring 8. The end of the mold cavity is made imperforate and the glass is drawn up into the mold when it is placed in contact with the surface of a supply of molten glass 19, by a vacuum communicated to the mold cavity through a series of thin slots 9 or other small air ports, shown slightly exaggerated for clearness. The head 6 and arm 10, which supports it, are hollow and connected with a suitable source of vacuum so that the air is exhausted as indicated by the arrows in Figs. 1 and 2.

When the neck ring is brought into engagement with the surface of the molten glass, the latter is sucked up into the mold by the vacuum, but as soon as the incoming glass covers the slots 9, it thereby shuts off communication between the mold cavity and the source of vacuum so that any further drawing in of the glass is dependent upon the residual vacuum in the closed pocket thus formed. As the glass continues to rise toward the top of the mold, the vacuum is progressively weakened by the contraction of the space so that its action ceases before the mold is filled, leaving a depression 11 in the top of the parison, (Fig. 1), which if left in this condition, out of contact with the mold wall, would be less chilled, and therefore be softer than the rest of its surface, and hence would be blown out thinner than the surrounding surface.

Figure 3:
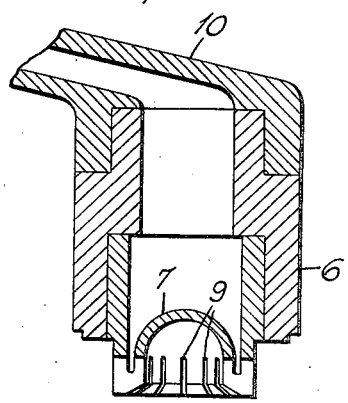
Fig. 3 is a vertical section showing the discharge of the parison from the mold to the device for continuing the shaping of the ware, which is shown as a blow-pipe.

It is usual to employ a knife 12 to sever the connection between the glass in the mold and that in the source of supply, and it is convenient to apply the pressure to the glass in the mold in connection with the severing means. For this purpose the knife 12 may be perforated at 13 for the admission of compressed air against the bottom of the parison after severing. The air may be supplied through a passageway 14 in the arm 15 carrying the knife 12. The pressure against the mold charge causes the depression 11 to be filled out, so that the parison conforms to the shape of the mold cavity and its entire surface is equally affected by contact with the wall of that cavity. The amount of residual air which may remain from the vacuum in the depression 11 is so slight as to be negligible. The slight cavity formed by the air pressure at 20 (Figs. 2 and 3) is not objectionable as it coincides with and becomes a part of the initial blow cavity formed or enlarged later by the plunger 21 in the subsequent operations.

Figure 4:
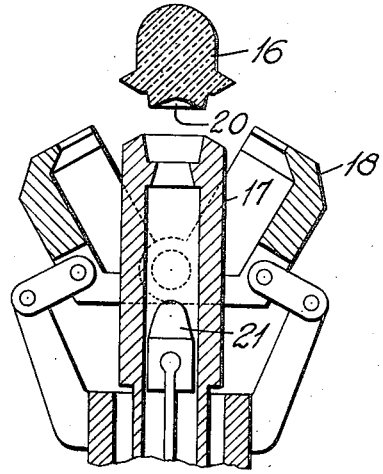
Fig. 4 shows the parison on the blow-pipe ready for further operation.
Figure 4:
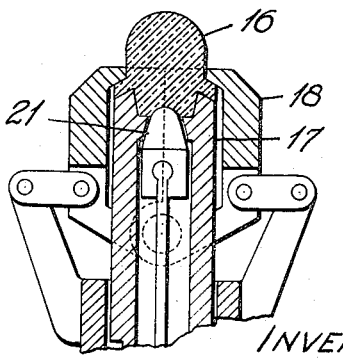

After the charge has thus been shaped to the mold, the knife 12 is withdrawn and the neck ring 8 is opened to discharge the parison 16, (Fig. 3) for further treatment, as by a blow-pipe 17, where it is grasped by jaws 18, as shown in Fig. 4. The parison is now ready for the usual steps in the formation of an electric light bulb, which may be as shown in the aforesaid patent.

I claim:

1. The method of forming a parison which includes the steps of drawing a charge of molten glass from a mass into an imperforate mold cavity by a vacuum in the cavity, separating the charge from the mass, and applying pressure to the charge to force it upwardly into the cavity.

2. Apparatus for shaping a glass parison, comprising a mold having an imperforate pocket, means for creating a partial vacuum within the pocket to suck the glass therein, and means for applying pressure to the glass in the mold to force it upwardly into contact with the wall of the pocket.

3. Apparatus for shaping molten glass, comprising a suction mold having a passageway connected with a source of vacuum and arranged to suck a charge to a point beyond said passageway, means for separating the charge in the mold from the supply, and means for applying pressure to the charge to force it into the mold.

4. Apparatus for making parisons of molten glass, comprising a suction mold having a passageway extending from a point remote from the end of the mold cavity to a source of vacuum, means for severing a charge sucked into the mold from a mass of glass, and means for pressing the charge toward the end of the mold cavity.

5. Apparatus for making parisons of molten glass, comprising a mold having an imperforate pocket at the upper end of the mold cavity, means for producing a partial vacuum in the pocket whereby a charge of glass is sucked therein, a knife movable across the entrance to the mold, and means for immediately applying upward pneumatic pressure to the end of the charge severed by the knife.

6. Apparatus for making parisons of molten glass, comprising a mold having an imperforate pocket at the upper end of the mold cavity, means for producing a partial vacuum in the pocket whereby a charge of glass is sucked therein, a knife movable across the entrance to the mold, and automatic means for applying pneumatic pressure upwardly to the charge after the knife has closed the entrance to the mold.

Signed at Hartford, Connecticut, this 27th day of March, 1922.

KARL E. PEILER.